(12) United States Patent
Bjorstrom et al.

(10) Patent No.: US 7,568,277 B1
(45) Date of Patent: Aug. 4, 2009

(54) METHOD FOR MANUFACTURING A MULTI-PIECE HEAD SUSPENSION

(75) Inventors: Jacob D. Bjorstrom, Hutchinson, MN (US); Clark T. Olsen, Dassel, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 183 days.

(21) Appl. No.: 11/555,786

(22) Filed: Nov. 2, 2006

(51) Int. Cl.
*G11B 5/127* (2006.01)
*H04R 31/00* (2006.01)

(52) U.S. Cl. .............. 29/603.03; 29/603.05; 29/603.06; 29/603.07; 360/240; 360/244.2; 360/244.5; 360/245.2; 360/245.3

(58) Field of Classification Search .............. 29/603.03, 29/603.05, 603.06, 603.07; 360/240, 244.2, 360/244.5–244.8, 245.2, 245.3
See application file for complete search history.

(56) References Cited

U.S. PATENT DOCUMENTS

| | | | |
|---|---|---|---|
| 5,057,953 A | 10/1991 | Wanlass | |
| 5,187,625 A | 2/1993 | Blaeser et al. | |
| 5,198,945 A | 3/1993 | Blaeser et al. | |
| 5,844,752 A | 12/1998 | Bozorgi et al. | |
| 5,870,252 A | 2/1999 | Hanrahan | |
| 5,886,857 A * | 3/1999 | Symons et al. | ........... 360/245.2 |
| 5,924,187 A | 7/1999 | Matz | |
| 6,147,839 A | 11/2000 | Girard | |
| 6,466,412 B1 * | 10/2002 | Adams et al. | ............ 360/245.2 |
| 6,741,424 B1 | 5/2004 | Danielson et al. | |
| 6,956,721 B1 | 10/2005 | Khan | |
| 7,016,159 B1 | 3/2006 | Bjorstrom et al. | |
| 2006/0158782 A1 | 7/2006 | Wakatsuki et al. | |

* cited by examiner

*Primary Examiner*—Paul D Kim
(74) *Attorney, Agent, or Firm*—Faegre & Benson LLP

(57) ABSTRACT

A method for forming rails on the beam region of a disk drive head suspension. Rails are formed on a first portion of the beam region while supporting the beam region at a first location. Rails are formed on a second portion of the beam region while supporting the beam region at a second location that is different than the first location.

19 Claims, 10 Drawing Sheets

METHOD FOR MANUFACTURING A MULTI-PIECE HEAD SUSPENSION

FIELD OF THE INVENTION

The invention relates generally to a method for manufacturing a multi-piece head suspension for use in a disk drive. In particular, the invention is a two-stage method of manufacturing a multi-piece head suspension having full length rails.

BACKGROUND OF THE INVENTION

Disk storage devices include a head suspension having a beam region for positioning a head slider in close proximity of the rotating disk. In typical applications, the fast spinning disks create aerodynamic forces acting on the head slider and other parts of the head suspension. The uneven disk surfaces cause fluctuations in the aerodynamic forces which detrimentally effect the resonance and shock performance of the beam region. In order to reduce the impact of the fluctuating aerodynamic forces, rails are formed over a portion of the beam region proximate the head slider.

FIG. 1 is an illustration of a prior art 4-piece (i.e., multi-piece) head suspension 10. Suspension 10 is formed from a number of separate components including beam 12, flexure 14, hinge or spring 16, and base plate 18. Conventional methods such as welding can be used to connect the components. As shown, flexure 14 is attached to beam 12 and extends from the distal end of the beam. Spring 16 is attached at its distal end to a proximal end of beam 12. Base plate 18 is attached to mounting region 19 on a proximal end of spring 16. Beam 12 is shown having beam tabs 20 on both side edges at the proximal end, and rails 22 on both side edges extending from beam tabs 20 to proximate the distal end. Beam tabs 20 are remnants from the manufacturing process during which a beam carrier strip (not shown), connected to beam tabs 20, supports and holds head suspension 10 in place relative to the manufacturing tools (not shown) during the formation (e.g., by mechanical bending) of rails 22 and during the assembly of beam 12 to spring 16. Following these assembly steps, beam 12 is detabbed from the carrier strip leaving beam tabs 20 extending out of the plane of beam 12.

Unfortunately, tabs 20 can detrimentally effect the overall performance and operation of suspension 10. There is, therefore, a need for improved suspensions. In particular, there is a need for suspensions providing enhanced resonance performance. Suspensions of these types would be especially desirable if they can be manufactured by efficient forming and assembly methods.

SUMMARY OF THE INVENTION

The invention is an efficient method for forming full length rails on a multi-piece head suspension assembly. One embodiment of the invention includes forming rails on a first portion of a beam region while the beam region is tabbed to a beam carrier strip. The beam region with rails on the first portion is attached to a hinge tabbed to a hinge carrier strip. The beam region is detabbed from the beam carrier strip. Rails are then formed on a second portion of the beam region after the beam region is detabbed from the beam carrier strip.

In another embodiment of the invention the beam region is supported by the beam carrier strip while the rails are formed on the first portion of the beam region. The beam region is supported by the hinge carrier strip while the rails are formed on the second portion of the beam region. The rails on the first and second portions of the beam region are contiguous.

DETAILED DESCRIPTION OF THE PREFERRED EMBODIMENTS

Figure 2:
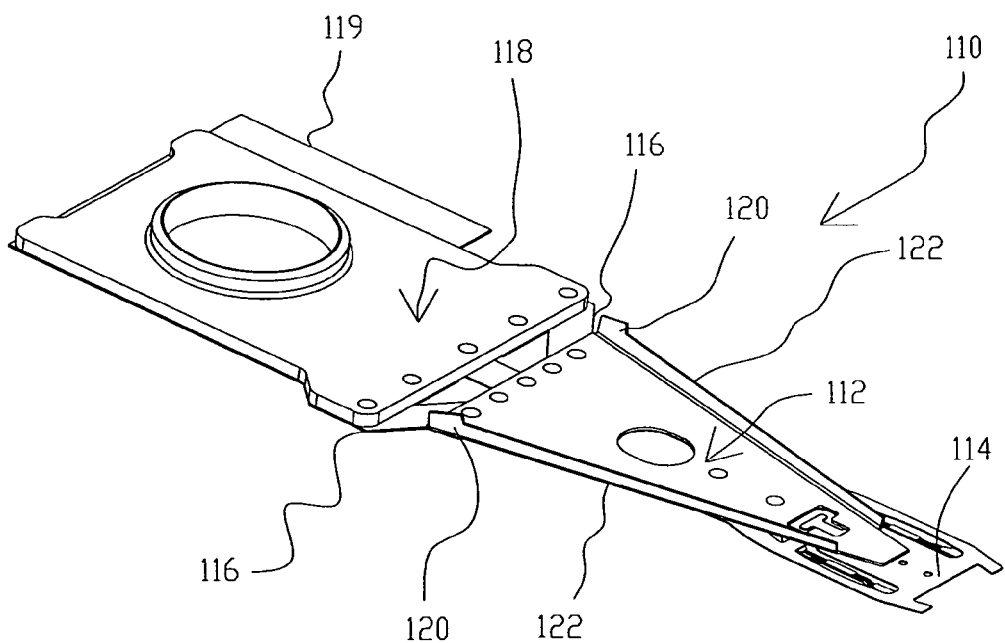
FIG. 2 is an isometric view of a multi-piece head suspension with full length rails in accordance with an embodiment of the invention.

A 4-piece (i.e., multi-piece) head suspension 110 in accordance with an embodiment of the invention is shown in FIG. 2. Suspension 110 includes beam region 112, flexure 114, spring component 116, and base plate 118. As shown, flexure 114 is attached to beam region 112 and extends from a distal end of the beam region. Spring component 116 is attached at its distal end to a proximal end of beam region 112. Base plate 118 is mounted to actuator mounting region 119 on the proximal end of spring component 116. Conventional methods such as welding can be used to attach beam region 112, flexure 114, spring component 116, and base plate 118.

Figure 1:
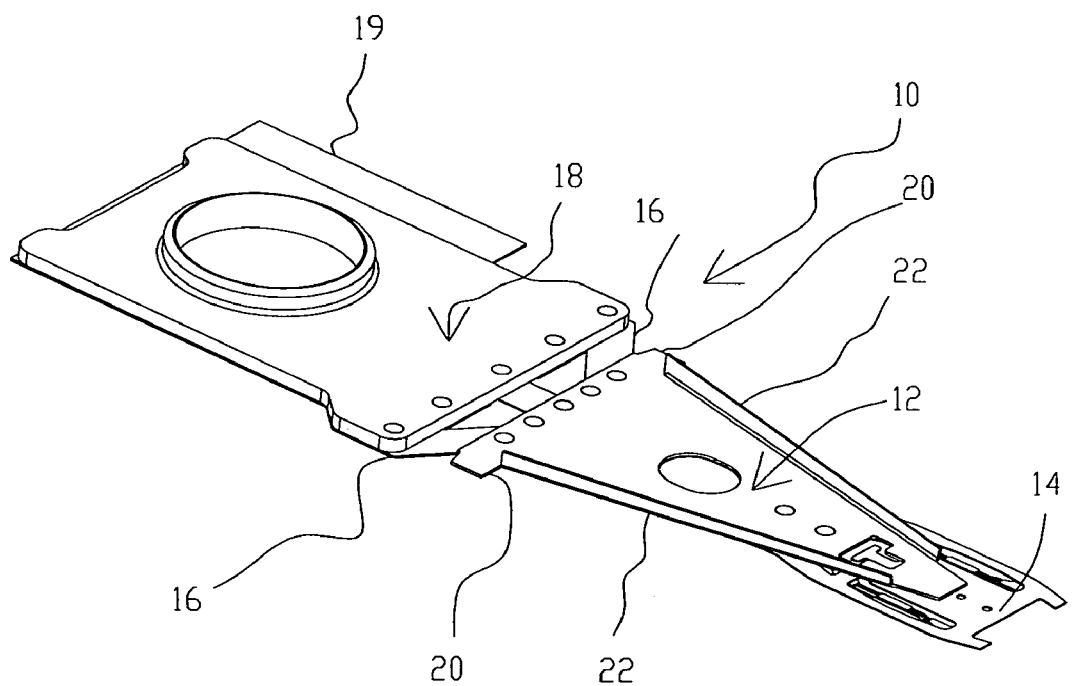
FIG. 1 is an isometric view of a prior art multi-piece head suspension.

Head suspension 110 also includes full length rails 122 extending along both side edges of beam region 112. Rails 122 include remnant tab footprints 120. Tab footprints 120 are substantially aligned with the side edges of beam region 112 and are formed into rails contiguous with, and as an extension of, rails 122 in the illustrated embodiment. In the illustrated embodiment, tab footprints 120 are located at the proximal end of rails 122. In other embodiments (not shown), the tab footprints can be located at other positions on the side edges of beam region 112. The level of stiffness provided by full length rails 122 to the thin material of beam region 112 will be relatively more than that provided by partial length rails 22 of the prior art beam region 12 described with reference to FIG. 1 in the background section. Accordingly, the resonance and shock performances of beam region 112, and hence of head suspension 110, will be relatively better than that of prior art beam region 12 and head suspension 10.

A method for manufacturing head suspension 110 can be described with reference to FIGS. 3 through 8B. As described below, full length rails 122 are formed in a two stage process.

Figure 3:
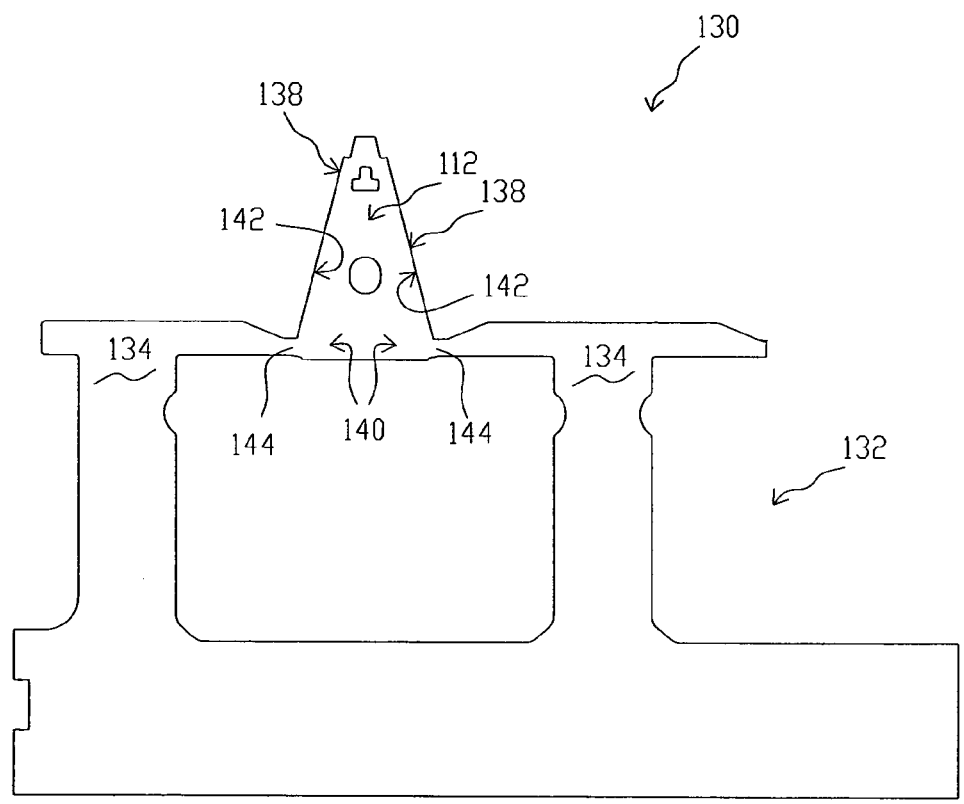
FIG. 3 is an illustration of a beam component having a beam region and a beam carrier strip and used in accordance with one embodiment of the invention.

FIG. 3 shows beam component 130 having beam region 112 supported by beam carrier strip 132. Beam region 112 has side edges 138 including tab portions 140 and free portions 142. Beam tabs 144 connect tab portions 140 of beam region 112 to arms 134 of carrier strip 132. In the embodiment shown, tab portions 140, including beam tabs 144, are located at the proximal end of beam region 112. However, in other embodiments (not shown), tab portions 140 and beam tabs 144 are located at other positions (e.g., the distal end) of beam region 112. In alternative embodiments (not shown), tab portions 140 and beam tabs 144 are located along side edges 138 at positions between the distal and proximal ends of beam region 112. In the illustrated embodiment, free portions 142 along side edges 138 of beam region 112 extend from tab portions 140 to proximate the distal end of beam region 112.

Figure 4A:
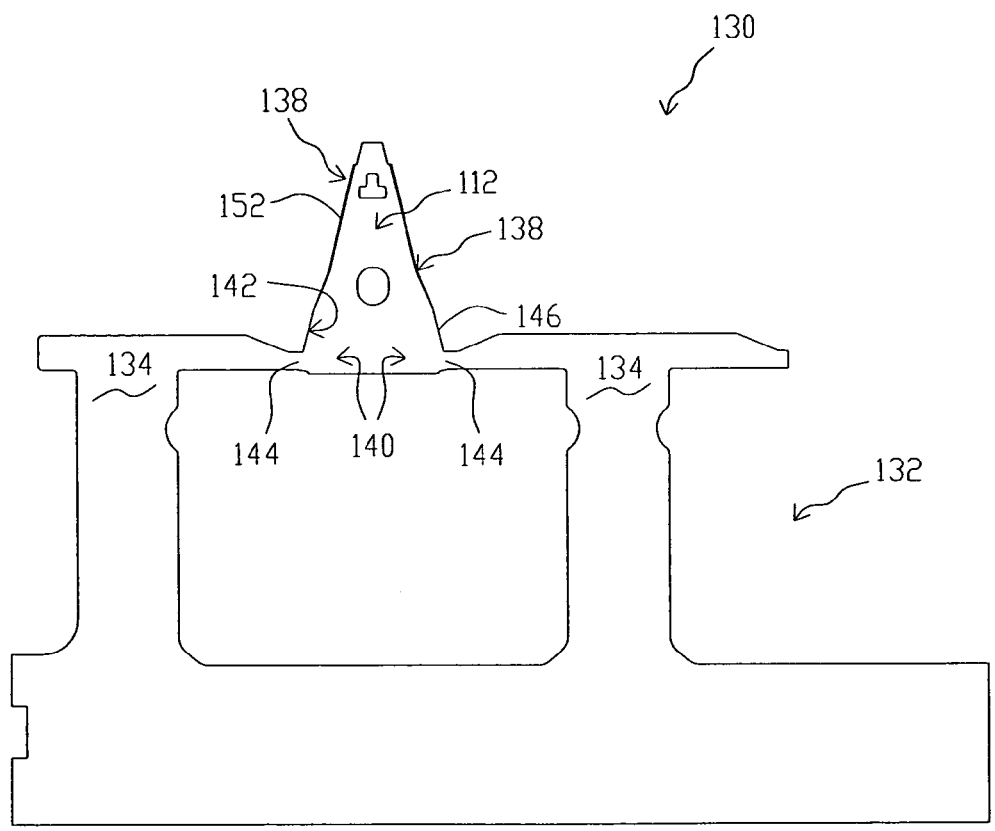
FIG. 4A is an illustration of the beam component shown in FIG. 3 after rails are formed on a portion of the beam region.
Figure 4B:
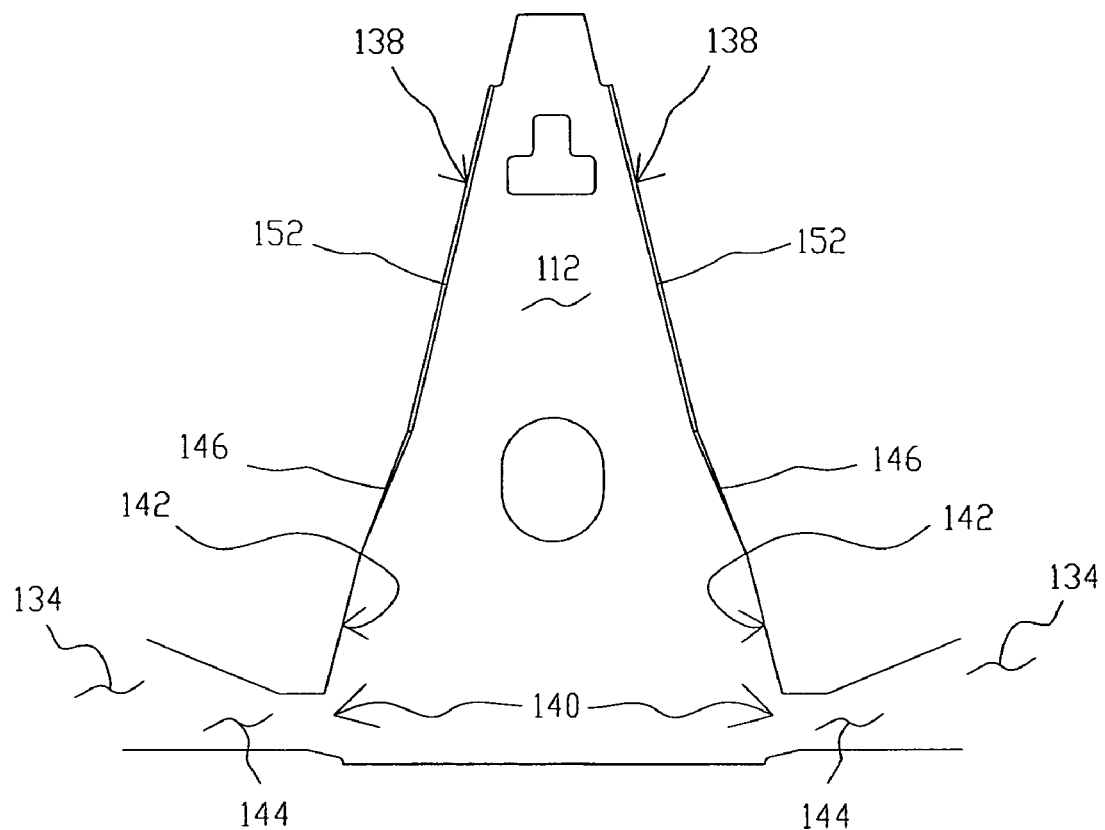
FIG. 4B is a detailed view of the beam region shown in FIG. 4A.

During the first-stage of the method, beam region 112 is supported and held in place relative to the manufacturing tooling (not shown) by beam carrier strip 132 as shown in FIG. 4A. Rail portions 152 are formed along substantial segments of free portions 142 of side edges 138. As shown in FIG. 4B, rail portions 152 extend from proximate the distal end of beam region 112 to remnant free portions 142, and include transition regions 146. Transition regions 146 have a gradual transition from rail portions 152 to remnant free portions 142. Rail portions 152 can be formed in a conventional manner by bending a portion of the edge material out of a plane of beam region 112. As shown, rails are not formed along remnant free portions 142 and tab portions 140 of beam region 112 during the first forming stage of the method.

Figure 5:
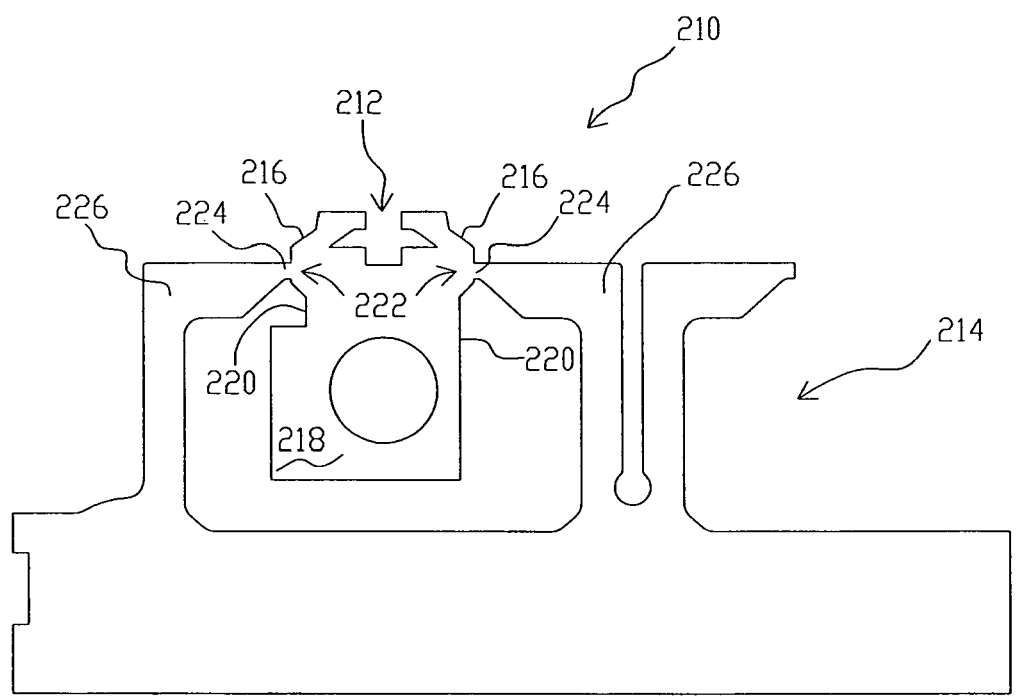
FIG. 5 is an illustration of a spring component having a hinge region and a hinge carrier strip in accordance with one embodiment of the invention.

FIG. 5 shows hinge component 210 having hinge region 212 supported by hinge carrier strip 214. Hinge region 212 includes spring component 216, actuator mounting region 218, and edges 220. Hinge region 212 also includes tab portions 222 along edges 220 of actuator mounting region 218. Hinge tabs 224 extending from tab portions 222 connect actuator mounting region 218 to arms 226 of hinge carrier strip 214. In the embodiment shown, tab portions 222 and hinge tabs 224 are located at the distal end of actuator mounting region 218. However, in other embodiments (not shown), tab portions 222 and hinge tabs 224 are located at other positions (e.g., a proximal end of the actuator mounting region). In still other alternative embodiments (not shown), the tab portions including the hinge tabs are located along the edges at positions between the distal and proximal ends of the actuator mounting region.

Figure 6:
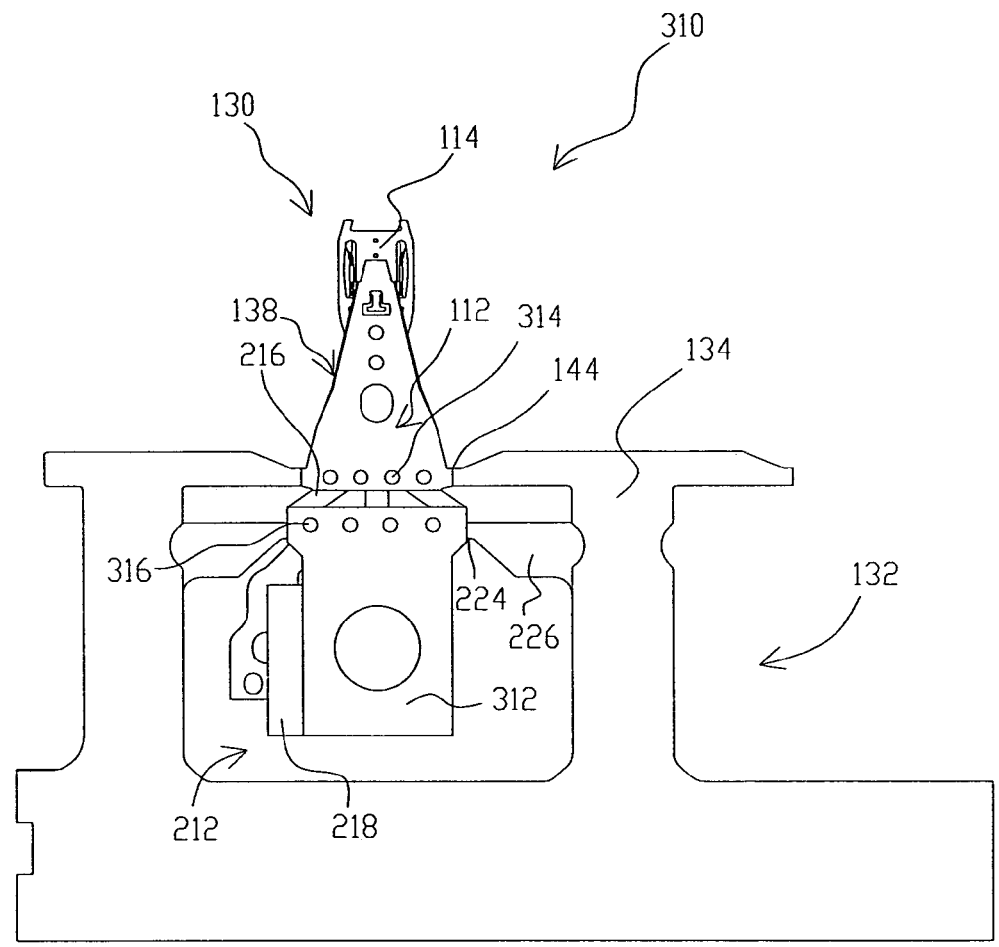
FIG. 6 is an illustration of a multi-piece head suspension after assembly of a flexure, base plate and the spring component shown in FIG. 5 to the beam component shown in FIG. 3.

The assembly of beam region 112 to hinge region 212 and the assembly of base plate 312 to actuator mounting region 218 can be described with reference to FIG. 6. In the embodiment shown, beam region 112 and hinge region 212 are respectively supported and held in place by beam carrier strip 132 and hinge carrier strip 214 (FIG. 5). The proximal end of beam region 112 is positioned at the desired location on the distal end of spring component 216. Conventional methods such as welding at weld points 314 are then used to attach spring component 216 to beam region 112. In the embodiment shown, base plate 312 is also welded or otherwise attached to actuator mounting region 218 of hinge region 212 (e.g., at weld points 316). Flexure 114 is also welded or otherwise attached to the distal end of beam region 112 in the illustrated embodiment.

Figure 7:
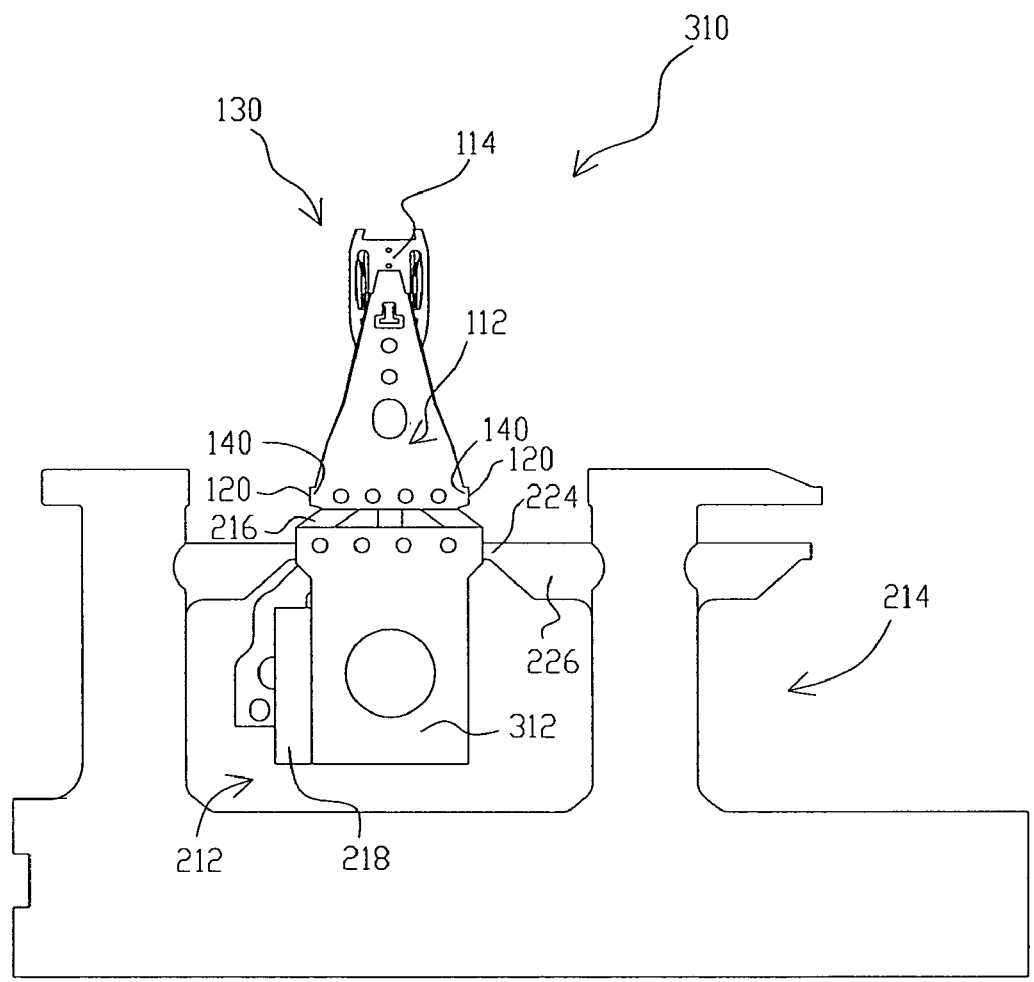
FIG. 7 is an illustration of the multi-head suspension shown in FIG. 6 after detabbing the beam component from the beam carrier strip.
Figure 8A:
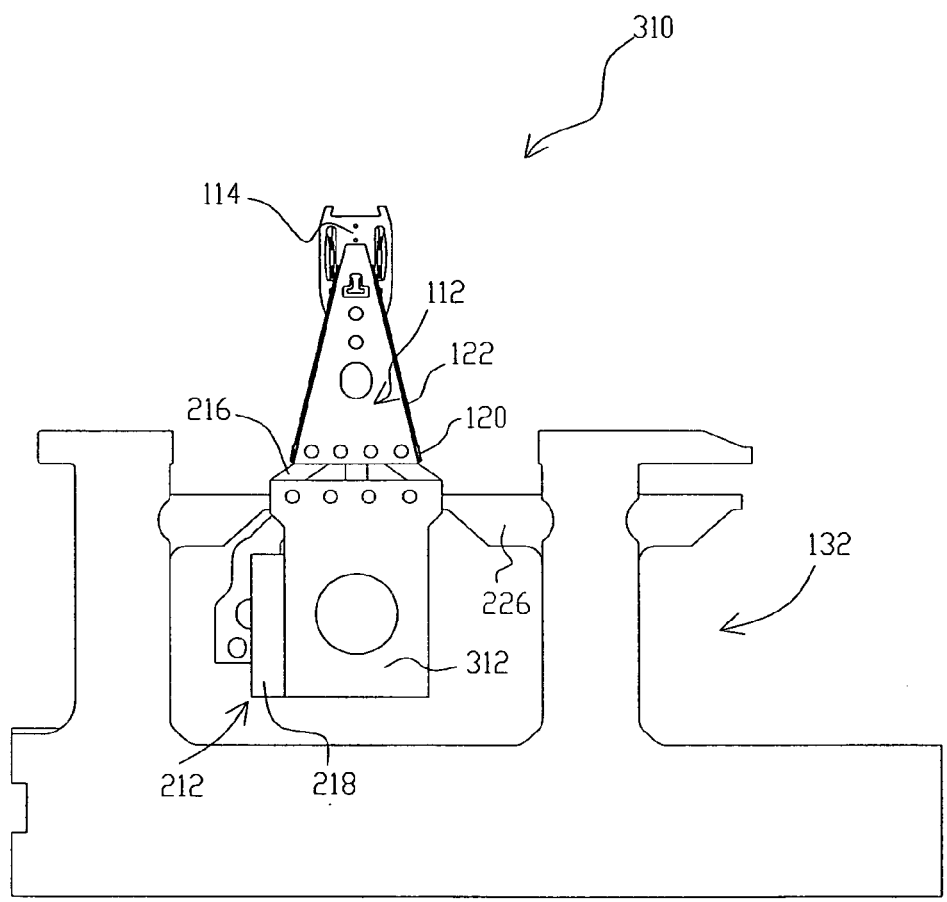
FIG. 8A is an illustration of the multi-piece head suspension shown in FIG. 7 after forming the full length rails.
Figure 8B:
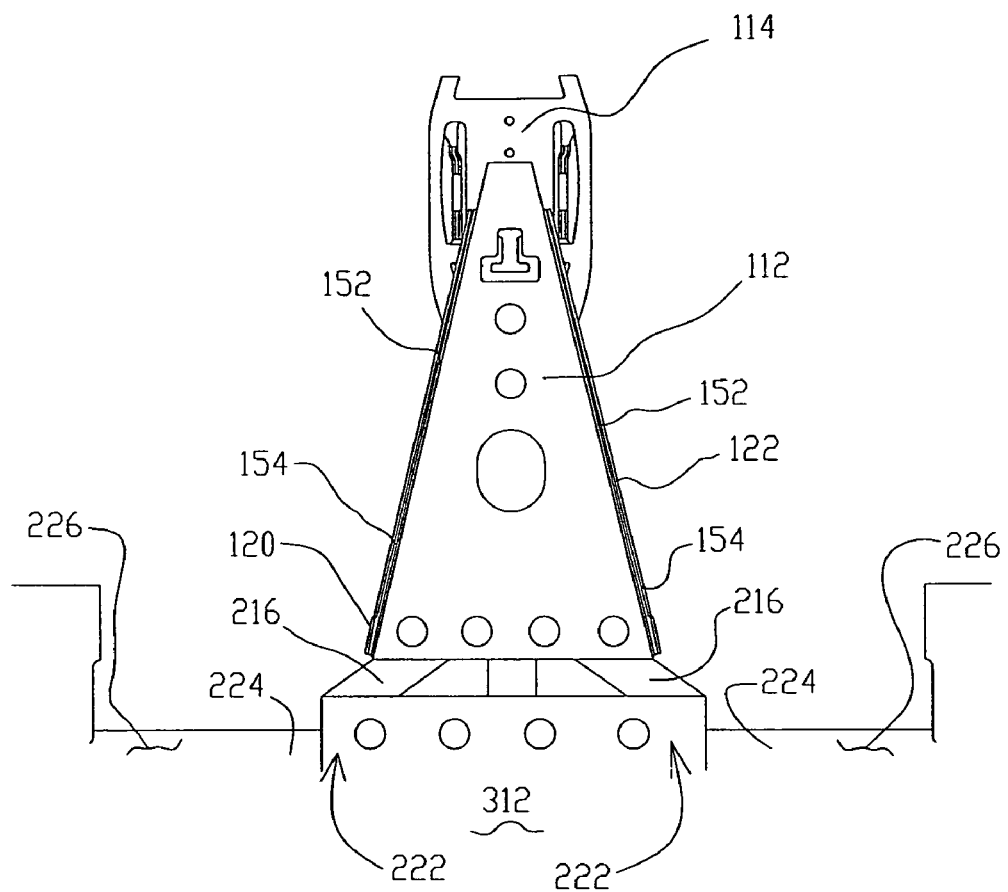
FIG. 8B is a detailed view of the beam region of the multi-piece head suspension shown in FIG. 8A.

Following the assembly of beam region 112 and hinge region 212, beam region 112 is disconnected from beam carrier strip 132 as shown in FIG. 7. Beam tabs 144 (FIG. 3) have been removed and beam region 112 is shown detabbed with remnant tab footprints 120. The detabbing is accomplished by conventional methods such as causing a fracture in the material in the region where beam tabs 144 connect to tab portions 140. In the embodiment shown, tab footprints 120 are substantially aligned with the side edges of tab portions 140, and the side edges of remnant free portions 142 on beam region 112. Beam region 112, being attached to hinge region 212 at spring component 216, is shown supported by hinge carrier strip 214.

During the second stage of the method, rail portions 154 are formed at transition region 146 and at tab portions 140 of beam region 112 to complete full rails 122. The formation of rail portions 154 during the second stage of the method can be described with reference to FIG. 8B in view of FIG. 4B. In the embodiment shown in FIG. 4B, rails 152 on side edges 138 extend from proximate the distal end of beam region 112 to remnant free portions 142 and include transition regions 146. In the embodiment shown in FIG. 8B, both side edges of transition regions 146, remnant free portions 142, and tab portions 140 including tab footprints 120 on beam region 112 are transformed into rail portions 154 that are contiguous with rail portions 152. Rail portions 154 are formed in a conventional manner by bending a portion of the edge material out of a plane of beam region 112. The result, as shown, are full rails 122 extending along both side edges of beam region 112, including tab portions 140. The manufacture of suspension 110 can then be completed in a conventional manner, including detabbing hinge component 210 from carrier strip 214. Although rails 122 have an "L" shape in the illustrated embodiment, the rails can take other slopes and configurations in other embodiments (not shown).

Beam regions having full length rails along their entire side edges will be relatively more stiff than beam regions without full length rails. Accordingly, beam regions with full length rails will exhibit improved resonance and shock performances relative to beam regions without full length rails. Furthermore, the full length rails on multi-piece head suspensions can be achieved by an efficient assembly and forming process.

Although the invention has been described with reference to certain embodiments, those skilled in the art will recognize that modifications can be made to the form and detail without departing from the spirit and scope of the invention. For example, the two-stage rail forming process can be used on other suspension components such as flexures. Also, the beam region (or other suspension components having rails formed using a two-stage method in accordance with the invention) can be attached to and supported by suspension components other than the hinge region (e.g., a flexure or a base plate) during the detabbing and/or the second rail forming step. Furthermore, the tabs supporting the beam region (or other components) from a carrier strip can be connected to the beam region at locations other than the side edges of the beam region (e.g., at the heads).

What is claimed is:

1. A method for manufacturing a multi-piece head suspension, including:
   providing a beam component including:
      a beam carrier strip;
      a beam region having edges with free portions and tab portions; and
      one or more beam tabs connecting the beam carrier strip to the tab portions of the beam region edges;
   providing a hinge component including:
      a hinge carrier strip;
      a hinge region having:
         a spring component;
         edges with tab portions; and
         one or more hinge tabs connecting the hinge carrier strip to the tab portions of the hinge region edges;
   forming rails on the free portions of the beam region edges of the beam component while the beam component is supported by the beam carrier strip;

attaching the beam region of the beam component to the spring component of the hinge region;
detabbing the beam tabs of the beam component from the beam carrier strip while the hinge component is supported by the hinge carrier strip; and
forming rails on the tab portions of the beam region edges of the beam component after detabbing the beam tabs and while the hinge component is supported by the hinge carrier strip.

2. The method of claim 1, wherein forming the rails on the tab portions includes forming rails on the tab portions that are contiguous with the rails on the free portions.

3. The method of claim 1 wherein forming rails on the free portions of the beam region edges includes forming transition regions between the tab portions and the rails on the free portions.

4. A method for manufacturing a multi-piece disk drive head suspension, including:
forming rails on a first portion of a beam region while the beam region is tabbed to a beam carrier strip;
attaching the beam region with rails on the first portion to a hinge tabbed to a hinge carrier strip;
detabbing the beam region from the beam carrier strip; and
forming rails on a second portion of the beam region after the beam region is detabbed from the beam carrier strip.

5. The method of claim 4 wherein:
forming rails on the first portion of a beam region includes forming rails on the first portion of the beam region while the beam region is supported by the beam carrier strip; and
forming rails on the second portion of the beam region includes forming rails on the second portion of the beam region while the beam region is supported by the hinge carrier strip.

6. The method of claim 5 wherein forming rails on the second portion of the beam region includes forming rails on a portion of the beam region detabbed from the beam carrier strip.

7. The method of claim 6 wherein forming rails on the first portion of the beam region includes forming transition regions between the second portion of the beam region and the rails on the first portion of the beam region.

8. The method of claim 7 wherein:
forming rails on the first portion of the beam region includes forming rails on a distal portion of the beam region while the beam region is tabbed to one or more sides of a distal portion of the beam region; and
forming rails on the second portion of the beam region includes forming rails on a proximal portion of the beam region.

9. The method of claim 4 wherein forming rails on the second portion includes forming rails on the second portion that are contiguous with the rails on the first portion.

10. A method for forming rails on a beam region of a disk drive head suspension, including:
forming rails on a first portion of the beam region while supporting the beam region at a first location; and
forming rails on a second portion of the beam region while supporting the beam region at a second location that is different than the first location and while the beam region is free of support at the first location.

11. The method of claim 10 wherein forming rails on the second portion of the beam region includes forming rails at the first location.

12. The method of claim 10 wherein forming rails on the second portion includes forming rails on the second portion that are contiguous with the rails on the first portion.

13. The method of claim 10 wherein forming rails on the first portion includes forming transition regions between the first location and the rails on the first portion.

14. A method for manufacturing a multi-piece disk drive head suspension, including:
forming rails on a first portion of a first suspension component while the first suspension component is tabbed to a carrier strip;
attaching the first suspension component to a second suspension component;
detabbing the first suspension component from the carrier strip; and
forming rails on a second portion of the first suspension component after detabbing the first suspension component from the carrier strip and while supporting the first suspension component by the second suspension component.

15. The method of claim 14 wherein forming rails on the second portion of the first suspension component includes forming rails at a location that the first suspension component was detabbed from the carrier strip.

16. The method of claim 14 wherein:
forming rails on the first portion of the first suspension component includes forming rails on a portion of the first suspension component that is spaced from a location where the first suspension component is tabbed to the carrier strip; and
forming rails on the second portion of the first suspension component includes forming rails on a portion of the first suspension component where the first suspension component was tabbed to the carrier strip.

17. The method of claim 16 wherein:
forming rails on the first suspension component includes forming rails on a load beam component; and
attaching the first suspension component to the second suspension component includes attaching the load beam component to a hinge component.

18. The method of claim 14 wherein forming rails on the second portion includes forming rails on the second portion that are contiguous with the rails on the first portion.

19. The method of claim 14 wherein forming rails on the first portion includes forming transition regions between the second portion and the rails on the first portion.

\* \* \* \* \*